(12) United States Patent
Soma et al.

(10) Patent No.: US 8,178,238 B2
(45) Date of Patent: May 15, 2012

(54) POSITIVE-ELECTRODE ACTIVE MATERIAL FOR LITHIUM-ION SECONDARY BATTERY, POSITIVE ELECTRODE, MANUFACTURING METHOD THEREOF, AND LITHIUM-ION SECONDARY BATTERY

(75) Inventors: Masanori Soma, Fukushima (JP); Masayuki Ihara, Fukushima (JP); Kenichi Kawase, Fukushima (JP); Atsumichi Kawashima, Fukushima (JP)

(73) Assignee: Sony Corporation, Tokyo (JP)

( * ) Notice: Subject to any disclaimer, the term of this patent is extended or adjusted under 35 U.S.C. 154(b) by 758 days.

(21) Appl. No.: 12/269,526

(22) Filed: Nov. 12, 2008

(65) Prior Publication Data
US 2009/0123851 A1 May 14, 2009

(30) Foreign Application Priority Data
Nov. 14, 2007 (JP) ................. 2007-295177

(51) Int. Cl.
*H01M 4/131* (2010.01)
*H01M 4/1315* (2010.01)
*C01D 1/02* (2006.01)

(52) U.S. Cl. ........ 429/219; 429/221; 429/223; 429/224; 429/229; 429/231.3; 429/231.5; 429/231.95; 423/594.6

(58) Field of Classification Search ............... 429/231.3, 429/231.5, 231.95, 219, 221, 223, 224, 229; 423/594.6
See application file for complete search history.

(56) References Cited

U.S. PATENT DOCUMENTS

| 6,749,965 B1 * | 6/2004 | Kweon et al. ......... 429/231.3 X |
| 6,756,155 B1 * | 6/2004 | Kweon et al. ............ 429/231.95 |
| 7,112,228 B2 * | 9/2006 | Nogami et al. ........ 429/231.3 X |

FOREIGN PATENT DOCUMENTS

| JP | 04-223053 | 8/1992 |
| JP | 05-006779 | 1/1993 |
| JP | 10-079244 | 3/1998 |
| JP | 2000-012022 | 1/2000 |
| JP | 2003-020229 | 1/2003 |
| JP | 2003-045433 | 2/2003 |
| JP | 2004-319129 | 11/2004 |
| JP | 2005-216651 | 8/2005 |
| JP | 2005-243301 | 9/2005 |
| JP | 2006-012426 | 1/2006 |
| JP | 2007-294432 | 11/2007 |
| WO | 2006-018921 | 2/2006 |
| WO | 2006-123572 | 11/2006 |

* cited by examiner

*Primary Examiner* — Stephen J. Kalafut
(74) *Attorney, Agent, or Firm* — K&L Gates LLP

(57) ABSTRACT

A positive-electrode active material for a lithium-ion secondary battery has an average composition expressed by the following formula (1):

$$Li_xCo_{1-y-z}M_yCe_zO_{b-a}X_a \qquad (1)$$

wherein M represents at least one element selected from the group consisting of boron B, magnesium Mg, aluminum Al, silicon Si, phosphorous P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb, X represents a halogen element, and x, y, z, a, and b satisfy $0.2<x\leq1.2$, $0\leq y\leq0.1$, $0.5<z\leq5.0$, $1.8\leq b\leq2.2$, and $0\leq a\leq1.0$, respectively, and the concentration of cerium Ce is higher in the vicinity of the surface than in the inside.

10 Claims, 4 Drawing Sheets

POSITIVE-ELECTRODE ACTIVE MATERIAL FOR LITHIUM-ION SECONDARY BATTERY, POSITIVE ELECTRODE, MANUFACTURING METHOD THEREOF, AND LITHIUM-ION SECONDARY BATTERY

CROSS REFERENCES TO RELATED APPLICATIONS

The present application claims priority to Japanese Patent Application JP 2007-295177 filed in the Japanese Patent Office on Nov. 14, 2007, the entire contents of which is incorporated herein by reference.

BACKGROUND

The present application relates to a positive-electrode material for a lithium-ion secondary battery, a positive electrode, a method of manufacturing the positive electrode, and a lithium-ion secondary battery employing the positive electrode.

With the recent increase in performance and multi-functionality of mobile instruments, an increase in capacity of a secondary battery as a power source thereof has been urgently desired. As the secondary battery that can satisfy the desire, a nonaqueous-electrolyte secondary battery using lithium cobaltate for a positive electrode, using graphite for a negative electrode, and an organic mixture solvent containing a lithium salt supporting electrolyte for an electrolyte has attracted attention.

In the nonaqueous-electrolyte secondary battery working with 4.2 V in maximum, a positive-electrode active material such as lithium cobaltate used for the positive electrode provides only about 60% capacity of its theoretical capacity for actual use. Accordingly, by further raising a charging voltage, the remaining capacity can be utilized in principle. Actually, it is known that it is possible to enhance the energy density by setting the charging upper limit voltage to 4.25 V or more (for example, see PCT Publication No. 03/019713). In order to cope with the new requirement for an increase in capacity, the high-capacity negative electrode employing silicon Si, germanium Ge, tin Sn, and the like has been actively studied in recent years.

The above-mentioned nonaqueous-electrolyte secondary battery is mainly used in mobile instruments such as notebook personal computers and mobile phones and is exposed to relatively high temperature due to heat emitted from the instruments or heat inside a moving vehicle for a long time. When the charged nonaqueous-electrolyte secondary battery is exposed to such an environment, gas might be generated from a reaction of the positive electrode and the electrolyte.

When the gas is generated and for example, when the nonaqueous-electrolyte secondary battery is housed in a sheath member formed of a laminate film, the sheath member is inflated to enhance the thickness thereof and thus is not fit to the specification of a battery housing of an electronic apparatus. The internal resistance of the battery increases due to the reaction of the positive electrode and the electrolyte, thereby not utilizing the sufficient capacity.

Such a phenomenon causes a problem in the batteries with the past operating voltage and remarkably occurs in batteries of which the upper limit voltage is set to 4.25 V or more. It is considered that this is because the potential of the positive electrode increases in comparison with the past system and thus the reactivity to the electrolyte is promoted. Similarly, such a phenomenon causes a problem in high-capacity batteries using silicon Si, germanium Ge, or tin Sn for the negative electrode. This is because the potential of the negative electrode is higher than the past graphite negative electrode. Accordingly, even when it is used with the past operating voltage, the potential of the positive electrode increases in comparison with the past system.

There is a problem with a cycle characteristic in the batteries using the negative electrodes. However, there has been suggested that an electrolyte containing fluorine in molecules is used, thereby greatly improving the cycle characteristic.

However, the fluorine-based electrolyte is decomposed by the positive electrode at the time of conservation at a high temperature, thereby promoting the generation of gas.

On the other hand, in order to solve the above-mentioned problems, inventors of the present application has suggested a method of using a positive-electrode active material of which the surface is coated with another compound or coating the surface with a compound at the time of manufacturing a positive-electrode coating slurry to form a stable surface layer and thus to suppress the reactivity to the electrolyte (JP-A-2007-335331).

SUMMARY

As a result of the inventors' further study, improvements can be made based on inventors' earlier findings as discussed above.

That is, by performing the processes as described above, it was found that the nature and status of the positive-electrode mixture slurry vary at the time of manufacturing the electrode, thereby making it difficult to coat a current collector with the slurry. Specifically, since carbon of a conductive material in the positive-electrode mixture slurry coheres to deteriorate the fluidity of the slurry, the amount of added dispersion medium should be enhanced. On the contrary, when the amount of added dispersion medium is enhanced, the separation easily occurs during the storage of the slurry.

When a large amount of dispersion medium is used, the cost for raw materials increases and a large amount of heat is needed for drying the slurry after applying the slurry, thereby deteriorating the productivity. It was also proved that the distribution of the conductive material and the binder in the dried mixture layer is deviated and thus the electrode mixture layer is easily separated from the current collector. Accordingly, there is a problem in that the mixture layer is dropped at the time of winding or the capacity is deteriorated due to the long-term cycle of the battery.

There is a need for providing a positive-electrode active material for a lithium-ion secondary battery that has an excellent high-temperature storage characteristic and that is excellent in uniformity, durability, and productivity of a positive-electrode mixture layer, a positive electrode employing the positive-electrode active material, a method of manufacturing the positive electrode, and a lithium-ion secondary battery employing the positive electrode.

Upon further evaluation, the inventors discovered that the above-mentioned need can be accomplished by combining predetermined lithium composite oxide, in which a lot of cerium Ce exists in the vicinity of the surface, with a compound containing sulfur S or phosphorous P as needed.

That is, according to an embodiment, there is provided a positive-electrode active material for a lithium-ion secondary battery having an average composition expressed by the following formula (1):

$$Li_xCo_{1-y-z}M_yCe_zO_{b-a}X_a \quad (1)$$

wherein M represents at least one element selected from the group consisting of boron B, magnesium Mg, aluminum Al, silicon Si, phosphorous P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb, X represents a halogen element, and x, y, z, a, and b satisfy $0.2<x\leq1.2$, $0\leq y\leq0.1$, $0.5<z\leq5.0$, $1.8\leq b\leq2.2$, and $0\leq a\leq1.0$, respectively. Here, the concentration of cerium Ce is higher in the vicinity of the surface than in the inside.

According to another embodiment, there is provided a positive electrode for a lithium-ion secondary battery including a positive-electrode mixture layer and a current collector. The positive-electrode mixture layer includes a positive-electrode active material, a conductive material, and a binder. Here, the positive-electrode active material has an average composition expressed by the following formula (1):

$$Li_xCo_{1-y-z}M_yCe_zO_{b-a}X_a \qquad (1)$$

wherein M represents at least one element selected from the group consisting of boron B, magnesium Mg, aluminum Al, silicon Si, phosphorous P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb, X represents a halogen element, and x, y, z, a, and b satisfy $0.2<x\leq1.2$, $0\leq y\leq0.1$, $0.5<z\leq5.0$, $1.8\leq b\leq2.2$, and $0\leq a\leq1.0$, respectively. The concentration of cerium Ce is higher in the vicinity of the surface than in the inside. A compound including sulfur S and/or phosphorous P is included in the positive-electrode mixture layer.

According to another embodiment, there is provided a method of manufacturing a positive electrode for a lithium-ion secondary battery including a positive-electrode mixture layer, which includes a positive-electrode active material, a conductive material, and a binder, and a current collector. Here, the positive-electrode active material has an average composition expressed by the following formula (1):

$$Li_xCo_{1-y-z}M_yCe_zO_{b-a}X_a \qquad (1)$$

wherein M represents at least one element selected from the group consisting of boron B, magnesium Mg, aluminum Al, silicon Si, phosphorous P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium hi, tin Sn, lead Pb, and antimony Sb, X represents a halogen element, and x, y, z, a, and b satisfy $0.2<x\leq1.2$, $0\leq y\leq0.1$, $0.5<z\leq5.0$, $1.8\leq b\leq2.2$, and $0\leq a\leq1.0$, respectively. The concentration of cerium Ce is higher in the vicinity of the surface than in the inside. A compound containing sulfur S and/or phosphorous P is included in the positive-electrode mixture layer. The method includes the step of adding the compound containing sulfur S and/or phosphorous P to a positive-electrode mixture slurry used to form the positive-electrode mixture layer.

According to still another embodiment, there is provided a lithium-ion secondary battery including a positive electrode, which includes a positive-electrode mixture layer having a positive-electrode active material, a conductive material, and a binder, and a current collector, a negative electrode, and an electrolyte. Here, the positive-electrode active material has an average composition expressed by the following formula (1):

$$Li_xCo_{1-y-z}M_yCe_zO_{b-a}X_a \qquad (1)$$

wherein M represents at least one element selected from the group consisting of boron B, magnesium Mg, aluminum Al, silicon Si, phosphorous P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb, X represents a halogen element, and x, y, z, a, and b satisfy $0.2<x\leq1.2$, $0\leq y\leq0.1$, $0.5<z\leq5.0$, $1.8\leq b\leq2.2$, and $0\leq a\leq1.0$, respectively. The concentration of cerium Ce is higher in the vicinity of the surface than in the inside. A compound including sulfur S and/or phosphorous P is included in the positive-electrode mixture layer.

According to the above-mentioned embodiments, since the predetermined lithium composite oxide in which a lot of cerium Ce exists in the vicinity of the surface is combined with the compound including sulfur S and/or phosphorous P as needed, it is possible to provide a positive-electrode active material for a lithium-ion secondary battery that is excellent in uniformity, durability, and productivity of the positive-electrode mixture layer, a positive electrode employing the positive-electrode active material, a method of manufacturing the positive electrode, and a lithium-ion secondary battery employing the positive electrode.

Additional features and advantages are described herein, and will be apparent from the following Detailed Description and the figures.

DETAILED DESCRIPTION

Figure 1:
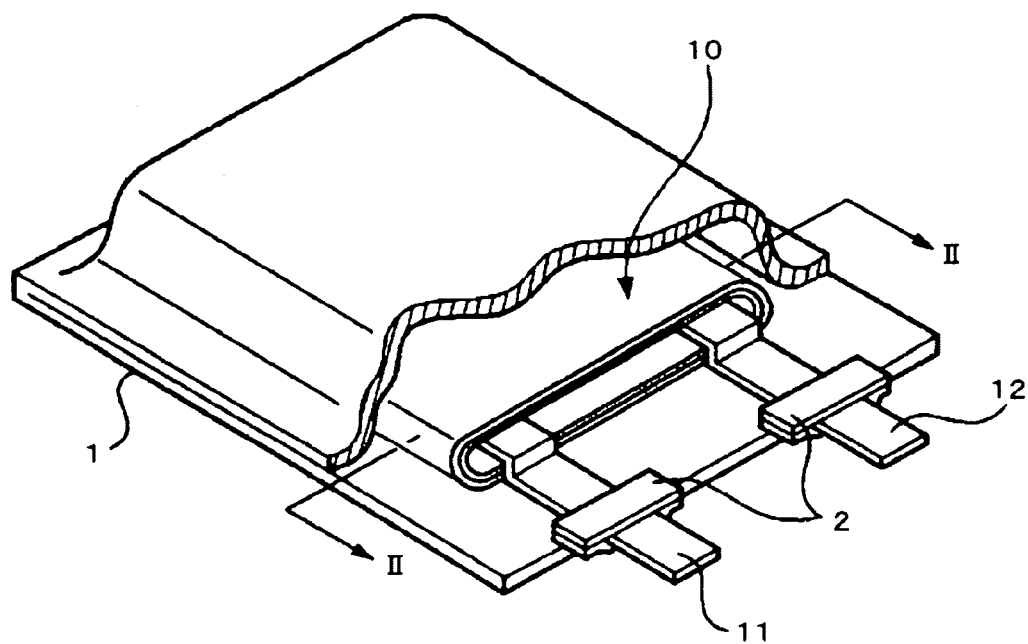
FIG. 1 is a perspective view illustrating a configuration of a secondary battery according to a first embodiment.

Hereinafter, a positive-electrode active material for a lithium-ion secondary battery, a positive electrode employing the positive-electrode active material, a method of manufacturing the positive electrode, and a lithium-ion secondary battery employing the positive electrode according to exemplary embodiments will be described in detail with reference to the figures. In the following description, "%" associated with concentration, content, and mixed amount represents a mass percentage as long as it is not particularly described differently.

1 First Embodiment 1-1 Positive-Electrode Active Material

A positive-electrode active material according to a first embodiment includes a lot of cerium Ce in the vicinity of the surface and the concentration of cerium is higher in the vicinity of the surface than in the inside thereof. Typically, the positive-electrode active material is particle shaped and a surface layer having a high concentration of cerium is formed in at least a part of the surface of a predetermined lithium composite oxide particle as a center thereof An average composition of the lithium composite oxide is expressed by the following formula (1):

$$Li_xCo_{1-y-z}M_yCe_zO_{b-a}X_a \qquad (1)$$

wherein M represents at least one element selected from the group consisting of boron B, magnesium Mg, aluminum Al, silicon Si, phosphorous P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb, X represents a halogen element, and x, y, z, a, and b satisfy $0.2<x\leq1.2$, $0\leq y\leq0.1$, $0.5<z\leq5.0$, $1.8\leq b\leq2.2$, and $0\leq a\leq1.0$, respectively.

The surface layer serves as a reaction suppressing layer and contains cerium Ce. The concentration of cerium therein is higher than that inside the lithium composite oxide particle.

The positive-electrode active material can be obtained by mixing and sintering a lithium-source compound, a cobalt-source compound, a compound containing other additive elements, and a cerium-source compound at the time of synthesizing a lithium composite compound.

An example of the lithium source includes lithium carbonate, lithium hydroxide, and lithium nitrate. An example of the cobalt source includes cobalt oxide, cobalt carbonate, and cobalt oxyhydroxide. An example of the cerium source includes cerium oxide and cerium nitrate.

At the time of performing the above-mentioned sintering, cerium having an ion radius greatly different from that of cobalt ions is not solved and is educed on the surface, thereby forming the surface layer.

In another method, the surface layer can be obtained by attaching a cerium compound to the surface of a lithium composite compound not containing cerium. An example of the attachment method includes a mechanofusion method, a mechanohybridization method, and a spray dry method. By heating the attached particles, the adhesion between the surface layer and the composite oxide particles can be made to be strong.

A method of confirming whether cerium exists in the particle surface of the lithium composite oxide is the same as a method for the compound containing sulfur S and/or phosphorous P to be described later.

The content of cerium in the vicinity of the surface, particularly, in the surface layer, is preferably in the range of 5 to 50 at. % with respect to cobalt Co in the lithium composite oxide.

When the content is less than 5 at. %, the reaction of the surface of the active material and the electrolyte solution at the time of high-temperature storage cannot be sufficiently suppressed. When the content is greater than 50 at. %, the insertion of lithium ions into the active material particles is hindered, thereby deteriorating the load characteristic.

1-2 Positive-Electrode Mixture (Layer)

The positive-electrode mixture includes the positive-electrode active material, a conductive material, and a binder and contains compounds including sulfur S and/or phosphorous P in an embodiment. Preferably, the compounds much exist in the vicinity of the particle surface of the lithium composite oxide, and typically cover at least a part of the particle surfaces to form a surface layer.

The surface layer serves as a reaction suppressing layer and the content of at least one of sulfur S and phosphorous P in the vicinity of the particle surface of the lithium composite oxide, particularly, in the surface layer, is higher than that inside the lithium composite oxide particles.

The materials are contained, for example, as a compound in the surface layer. More specifically, sulfur S is contained, for example, as $Li_2SO_4$ in the surface layer and phosphorous P is contained, for example, as $Li_3PO_4$ or $LiCoPO_4$ in the surface layer.

The content of at least one of sulfur S and phosphorous P is preferably equal to or more than 0.02 at. % and less than 10 at. % with respect to cobalt Co in the positive-electrode active material. When the content is equal to or more than 0.02 at. %, it is possible to obtain an excellent storage characteristic.

When the content is less than 10 at. %, it is possible to suppress an increase in internal resistance or a decrease in capacity.

The positive-electrode active material can be obtained by adding lithium composite oxide particles to an aqueous solution containing at least one of a sulfur-containing compound and a phosphorous-containing compound and kneading and then drying the resultant. For example, a hot-wind fixed shelf drier or a spray drier may be used as the dry method. The obtained dried mixture may be heated to stabilize the surface products.

One or two or more sulfur-containing compounds can be used as the sulfur-containing compound. An example of the sulfur-containing compound includes sulfate, sulfite, ammonium sulfate, ammonium hydrogen sulfate, and organic sulfate. One or two or more phosphorous-containing compounds can be used as the phosphorous-containing compound. An example of the phosphorous-containing compound includes phosphate, phosphite, hypophosphite, ammonium phosphate, ammonium hydrogen phosphate, and organic phosphate. In this embodiment, phosphonic acid, methane sulfonic acid, sulfobenzoic acid, sulfobenzoic anhydride, and mixtures thereof can be suitably used.

As a method of confirming that cerium Ce or at least one of sulfur S and phosphorous P exists in the surface, a method of comparing the atomic ratio and the feed composition of at least one of sulfur S and phosphorous P existing in the surface with respect to cobalt Co in the surface analysis of the scanning electron microscopy-energy dispersion X-ray spectrometry (SEM-EDS) and the X-ray photoelectron spectroscopy (XPS) can be used.

The positive-electrode active material is embedded in resin, the sectional intrusion is performed, and then the distribution in the section can be confirmed by the use of the time-of-flight secondary ion mass spectroscopy (TOF-SIMS). The surface compounds can be identified by the use of the X-ray diffraction (XRD) measurement or the TOF-SIMS measurement.

By the use of the above-mentioned analysis methods, particularly, the SEM-EDS, it can be confirmed whether cerium or sulfur S and/or phosphorous P forms the surface layer in all or a part of the particle surfaces of lithium composite oxide.

The mean particle size of the lithium composite oxide is preferably equal to or more than 1 μm and less than 30 μm. When the mean particle size is equal to or more than 1 μm it is possible to suppress the reaction of the positive electrode and the electrolyte, thereby suppressing the increase in generated gas. When the mean particle size is less than 30 μm, it is possible to obtain the sufficient capacity or the excellent load characteristic.

As described above, in this embodiment, the surface layer of compounds including cerium Ce or sulfur S and/or phosphorous P is preferably formed in predetermined lithium composite oxide in the positive-electrode active material or the positive-electrode mixture layer.

As described above, it is considered that cerium Ce forms a stable coating on the surface of the active material to suppress the reaction to the electrolyte solution. By adding compounds including at least one of phosphorous P and sulfur S to the positive-electrode mixture slurry, a thin coating is formed on the particle surface of lithium composite oxide. Since the coating has low activity about the electrolyte, it is considered that it is possible to suppress the reaction of the positive electrode and the electrolyte solution in the high-temperature storage state and to suppress the generation of gas or the increase in internal resistance.

In reforming the surface of the active material using cerium, when the amount of cerium increases, the high-temperature storage characteristic is improved depending on the added amount, but the battery capacity per weight is deteriorated. Accordingly, the maximum amount that can be actually added thereto is limited.

On the other hand, in reforming the surface using the compounds including at least one of phosphorous P and sulfur S, when the amount of the compounds increases, the nature and state of the mixture slurry are markedly deteriorated. Accordingly, by adding the compounds including at least one of phosphorous P and sulfur S to the positive-electrode mixture slurry in minimum using the positive-electrode active material of which the surface is reformed by cerium, it is possible to compensate for both defects and to improve the high-temperature storage characteristic.

1-3 Configuration of Secondary Battery

A configuration of a secondary battery according to the first embodiment will be described now with reference to FIGS. 1 and 2.

FIG. 1 is a perspective view illustrating a configuration of the secondary battery according to the first embodiment.

The secondary battery has a configuration in which a battery element 10 to which a positive electrode lead 11 and a negative electrode lead 12 are attached is housed in a film-like sheath member 1.

The positive electrode lead 11 and the negative electrode lead 12 have a longitudinal shape and are drawn out in the same direction toward the outside from the inside of the sheath member 1. The positive electrode lead 11 is formed of a metal material such as aluminum and the negative electrode lead 12 is formed of a metal material such as nickel Ni.

The sheath member 1 has a structure in which an insulating layer, a metal layer, and an outermost layer are laminated in this order and are bonded by a lamination process or the like. In the sheath member 1, the insulating layer is located on the inside and the outer edges are closely adhered to each other by fusion or adhesive.

The insulating layer is formed of polyolefin resin such as polyethylene, polypropylene, denatured polyethylene, denatured polypropylene, and copolymers thereof. These materials can lower the moisture transmission property and are excellent air-tightness.

The metal layer is formed of foil-like or plate-like aluminum, stainless, nickel, or iron. The outermost layer may be formed of the same resin as the insulating layer or nylon. These materials can enhance the resistance to the teardown or lunge. The sheath member 1 may have layers other than the insulating layer, the metal layer, and the outermost layer.

An adhesion film 2 for improving the close adhesion between the positive electrode lead 11 and the negative electrode lead 12 and the inside of the sheath member 1 to prevent the invasion of ambient air is inserted between the sheath member 1 and the positive electrode lead 11 and the negative electrode lead 12. The adhesion film 2 is formed of a material having a close adhesion property to the positive electrode lead 11 and the negative electrode lead 12, and is preferably formed of polyolefin resin such as polyethylene, polypropylene, denatured polyethylene, and denatured polypropylene, when the positive electrode lead 11 and the negative electrode lead 12 are formed of the above-mentioned metal material.

Figure 2:
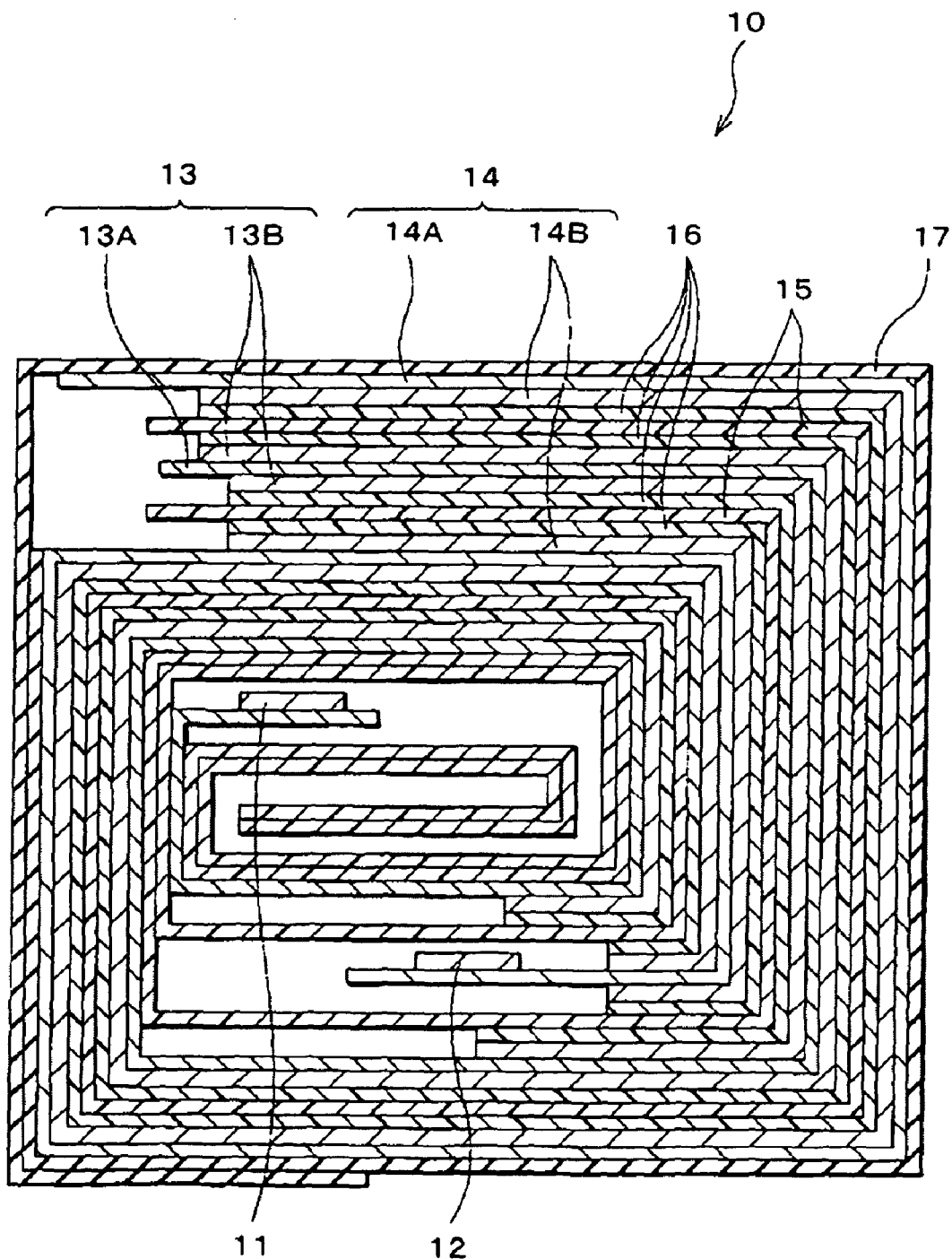
FIG. 2 is a sectional view of a battery element 10 taken along line II-II of FIG. 1.

FIG. 2 is a sectional view of the battery element 10 taken along line II-II of FIG. 1.

The battery element 10 is obtained by stacking and winding the positive electrode 13 and the negative electrode 14 with the separator 15 and the electrolyte 16 interposed therebetween, and the outermost portion is protected by a protective tape 17.

The positive electrode 13 includes a positive-electrode current collector 13A and positive-electrode mixture layers 13B disposed on both sides of the positive-electrode current collector 13A. The positive-electrode current collector 13A is formed of a metal foil such as an aluminum foil.

The positive-electrode mixture layer 13B includes the positive-electrode active material, a conductive material such as carbon if necessary, a binder such as polyvinylidene fluoride or polytetrafluoroethylene.

The positive-electrode mixture layer 13B may further include another positive-electrode active material in addition to the above-mentioned positive-electrode active material. An example of the another positive-electrode active material includes lithium-nickel composite oxide including lithium and nickel, lithium-manganese composite oxide having a spinel structure including lithium and manganese, and phosphate compound including lithium and iron.

The negative electrode 14 includes a negative-electrode current collector 14A and a negative-electrode mixture layer 14B disposed on both sides of the negative-electrode current collector 14A, similarly to the positive electrode 13. The negative-electrode current collector 14A is formed of a metal foil such as a copper foil.

The negative-electrode mixture layer 14B includes one or two or more negative electrode materials, which can occlude and desorb lithium, as the negative-electrode active material, and may further include a conductive material and a binder as needed.

An example of the negative electrode material that can occlude and desorb lithium includes carbon materials such as graphite, non-graphitizable carbon, and graphitized carbon. One of the carbon materials may be used singly or two or more may be mixed. Alternatively, two or more having different average particle diameters may be mixed for use.

An example of the negative electrode material that can occlude and desorb lithium includes a material including metal element or semimetal element forming an alloy along with lithium. Specifically, examples of the negative electrode material include a single body, an alloy, and a compound of the metal element forming an alloy along with lithium, a single body, an alloy, and a compound of the semimetal element forming an alloy along with lithium, and materials having phases of one or two or more thereof in at least a part.

An example of the metal element or semimetal element includes tin Sn, lead Pb, aluminum Al, indium In, silicon Si, zinc Zn, antimony Sb, bismuth Bi, cadmium Cd, magnesium Mg, boron B, gallium Ga, germanium Ge, arsenic As, silver Ag, zirconium Zr, yttrium Y, and hafnium Hf. Metal elements or semimetal elements of Group 14 in the long-period periodic table are preferable and silicon Si or tin Sn is particularly preferable. Silicon Si and tin Sn have great ability of occluding and desorbing lithium and provide high energy density.

The silicon alloy includes at least one selected from the group consisting of tin Sn, nickel Ni, copper Cu, iron Fe, cobalt Co, manganese Mn, zinc Zn, indium In, silver Ag, titanium Ti, germanium Ge, bismuth Bi, antimony Sb, and chromium Cr as a second element other than silicon. The tin Sn alloy includes at least one selected from the group consisting of silicon Si, nickel Ni, copper Cu, iron Fe, cobalt Co, manganese Mn, zinc Zn, indium In, silver Ag, titanium Ti, germanium Ge, bismuth Bi, antimony Sb, and chromium Cr as a second element other than tin Sn.

The compound of silicon Si or the compound of tin Sn includes, for example, oxygen O or carbon C, and may further include the above-mentioned second elements in addition to silicon Si or tin Sn.

The separator 15 is formed of any material, as long as it is electrically stable and chemically stable about the positive-electrode active material, the negative-electrode active material, and the solvent, and does not have the electrical conductivity. For example, an unwoven fabric of polymer, a porous film, a paper-like fiber of glass or ceramics can be used and plural ones thereof may be stacked. Particularly, a porous polyolefin film is preferably used or a composite thereof with heat-resistance materials such as fibers of polyimide, glass, and ceramics may be used.

The electrolyte 16 includes an electrolyte solution and a holding member containing polymer compounds for holding the electrolyte solution and is of a gel type. The electrolyte includes an electrolyte salt and a solvent dissolving the electrolyte salt. An example of the electrolyte salt includes lithium salts such as $LiClO_4$, $LiPF_6$, $LiBF_4$, $LiN(SO_2CF_3)_2$, $LiN(SO_2C_2F_5)_2$, and $LiAsF_6$. One thereof may be used as the electrolyte salt or two or more thereof may be mixed for use.

An example of the solvent includes lactone-based solvent such as γ-butyrolactone, γ-valerolactone, δ-valerolactone, and ε-caprolactone, ester carbonate-based solvent such as ethylene carbonate, propylene carbonate, butylenes carbonate, vinylene carbonate, dimethyl carbonate, ethylmethyl carbonate, and diethyl carbonate, ether-based solvent such as 1,2-dimethoxy ethane, 1-ethoxy-2-methoxy ethane, 1,2-diethoxy ethane, tetrahydrofuran, and 2-methyltetrahydrofuran, nitrile-based solvent such as acetnitrile, sulforan-based solvent, phosphates, ether phosphate solvent, and nonaqueous solvent such as pyrrolidones. One thereof may be used singly as the solvent or two or more may be mixed for use.

The solvent preferably includes a cyclic ester or a chained ester in which all or a part of hydrogen is fluorinated. The fluorinated compound preferably includes fluoroethylene carbonate or difluoroethylene carbonate.

When the negative electrode 14 including compounds of silicon Si, tin Sn, and germanium Ge as the negative-electrode active material is used, it is possible to improve the charging and discharging cycle characteristic.

The polymer compound serves to absorb and gelate the solvent and an example thereof includes fluorine-based polymer compounds such as polyvinylidene fluoride or vinylidene fluoride and copolymer of hexafluoropropylene, ether-based polymer compounds such as crosslinker including polyethylene oxide or polyethylene oxide, and polymer compounds including polyacrylonitrile, polypropylene oxide, or polymethyl methacrylate as a repetition unit. One of the first polymer compounds may be used singly or two or more may be mixed for use.

Particularly, the fluorine-based polymer compounds are preferable in view of stability of oxidation and reduction and copolymers containing vinylidene fluoride and hexafluoropropylene are more preferable. The copolymers may contain monoester of unsaturated dibasic acid such as monomethyl ester maleate, ethylene halide such as triethylene fluorochloride, a cyclic ester carbonate of an unsaturated compound such as vinylene carbonate, or acrylvinyl monomer containing epoxy group. This is because the polymers provide higher characteristic.

In the secondary battery having the above-mentioned configuration, an open-circuit voltage in a fully-charged state of a pair of positive electrode and negative electrode is set to, for example, 4.2 V or higher. The open-circuit voltage set to be higher than 4.2 V is preferably in the range of 4.25 V to 4.6 V and more preferably in the range of 4.35 V to 4.6 V. When the upper-limit charging voltage of the secondary battery is raised, the utilization rate of the positive-electrode active material can be enhanced, thereby extracting more energy. When the open-circuit voltage is 4.6 V or less, the oxidation of the separator 15 can be suppressed.

1-4 Method of Manufacturing Secondary Battery

A method of manufacturing the secondary battery according to the first embodiment will be described now.

First, the positive-electrode mixture layer 13B is formed on the positive-electrode current collector 13A to produce the positive electrode 13. The positive-electrode mixture layer 13B is formed by mixing powder of the positive-electrode active material, the conductive material and the binder to prepare a positive-electrode mixture, dispersing the positive-electrode mixture in a solvent such as N-methyl-2-pyrrolidone to form a paste-like positive-electrode mixture slurry, applying the positive-electrode mixture slurry to the positive-electrode current collector 13A, and drying and compacting the resultant.

The resultant obtained by adding phosphonic acid or methane sulfonic acid to a slurry including lithium composite oxide instead of the positive-electrode active material coated with sulfur and/or phosphorous may be used as the positive-electrode mixture slurry.

On the other hand, similarly to the positive electrode 13, the negative-electrode mixture layer 14B is formed on the negative-electrode current collector 14A to form the negative electrode 14. Then, the positive electrode lead 11 is attached to the positive-electrode current collector 13A and the negative electrode lead 12 is attached to the negative-electrode current collector 14A.

Then, the electrolyte and the polymer compound are mixed with a mixture solvent, the mixture solution is applied to the positive-electrode mixture layer 13B and the negative-electrode mixture layer 14B, and the mixture solvent is volatilized to form the electrolyte 16. The positive electrode 13, the separator 15, the negative electrode 14, and the separator 15 are sequentially stacked and wound, a protective tape 17 is attached to the outermost circumferential portion to form the battery element 10, the battery element is inserted into the sheath member 1, and then the outer circumferential edge of the sheath member 1 is thermally fused and bonded. At this time, the adhesion film 2 is inserted between the positive electrode lead 11 and the negative electrode lead 12 and the sheath member 1. As a result, the secondary battery shown in FIG. 1 is obtained.

The positive electrode 13 and the negative electrode 14 are wound with the separator 15 interposed therebetween instead of winding the positive electrode 13 and the negative electrode 14 after the electrolyte 16 is formed thereon, the resultant structure is inserted into the sheath member 1, and an electrolyte composition including an electrolyte solution and a monomer of the polymer compounds is injected therein, thereby polymerizing the monomer in the sheath member 1.

In the secondary battery, when it is charged, lithium ions are emitted from the positive electrode 13 and are occluded in the negative electrode 14 through the electrolyte 16. On the other hand, when it is discharged, lithium ions are emitted from the negative electrode 14 and occluded in the positive electrode 13 through the electrolyte 16.

As described above, according to the first embodiment, the surface layer containing cerium Ce is formed in at least a part of the respective lithium composite oxide particles as a center. Accordingly, when the charged secondary battery is stored under a high-temperature condition, it is possible to prevent gas from being generated due to the reaction of the positive electrode 31 and the electrolyte. It is also possible to prevent the internal resistance from increasing due to the reaction of the positive electrode 31 and the electrolyte.

Since the surface layer also includes at least one of phosphorous P and sulfur S, the reaction to the electrolyte solution is further suppressed.

Even when the open-circuit voltage in the fully-charged state of a pair of positive electrode and negative electrode is set to the range of 4.25 V, which is greater than 4.2 V, to 4.6 V or the range of 4.35 V to 4.6 V and the utilization rate of the positive-electrode active material is enhanced to raise the potential of the positive electrode 13, it is possible to suppress gas from being generated due to the reaction of the positive electrode 13 and the electrolyte. That is, it is possible to extract more energy and to remarkably improve the high-temperature storage characteristic.

Even in a secondary battery employing graphite widely used in the past for the negative-electrode active material, it is possible to suppress the increase in thickness of the battery at the time of high-temperature storage. This suppression is further remarkable in the secondary battery employing the negative electrode 14 using compounds such as silicon Si, tin Sn, and germanium Ge for the negative-electrode active material and employing cyclic or chained ester fluoride for the electrolyte 16.

2 Second Embodiment

A second embodiment will be described now. A secondary battery according to the second embodiment employs an electrolyte solution instead of the gel electrolyte 16 in the secondary battery according to the first embodiment. In this case, the electrolyte solution is impregnated in the separator 15. The same as the first embodiment can be used as the electrolyte solution.

The secondary battery having the above-mentioned configuration can be manufactured as follows. Similarly to the first embodiment except that the formation of the gel electrolyte 16 is omitted, the positive electrode 13 and the negative electrode 14 are wound to form a battery element 10, the battery element 10 is inserted into the sheath member 1, the electrolyte solution is injected therein, and then the sheath member 1 is sealed.

According to the second embodiment, it is possible to obtain the same advantages as the first embodiment.

3 Third Embodiment 3-1 Positive-Electrode Active Material

The positive-electrode active material in a third embodiment is similar to that of the first embodiment and thus description thereof is omitted.

3-2 Configuration of Secondary Battery

A configuration of a secondary battery according to the third embodiment will be described now with reference to FIGS. 3 and 4.

Figure 3:
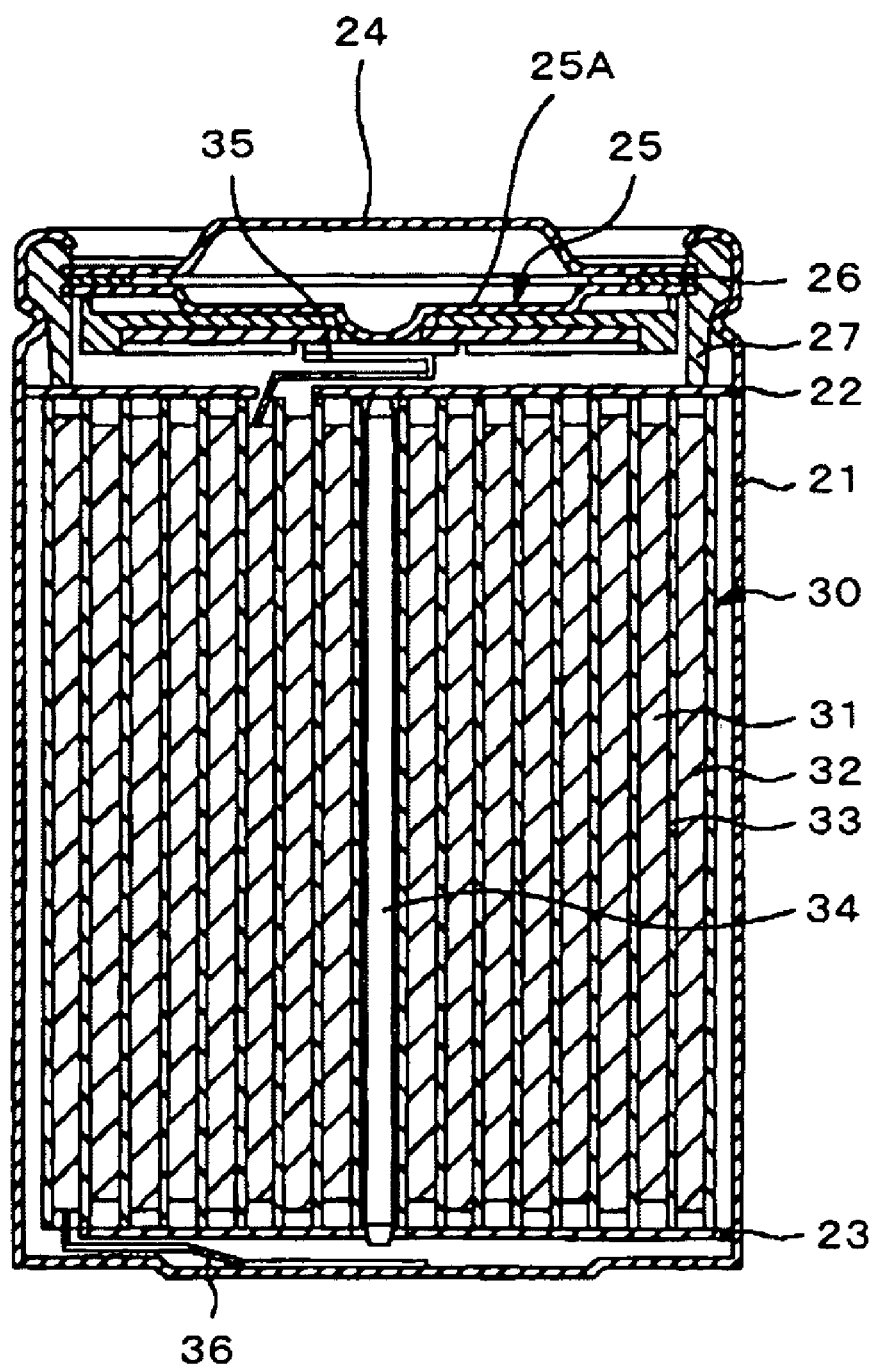
FIG. 3 is a sectional view illustrating a configuration of a secondary battery according to a third embodiment.

FIG. 3 is a sectional view illustrating a configuration of the secondary battery according to the third embodiment.

The secondary battery is called a cylindrical type and has a wound electrode member 30, in which a band-like positive electrode 31 and a band-like negative electrode 32 are wound with a separator 33 interposed therebetween, in a substantially hollow column-like battery can 21. The electrolyte solution as a liquid electrolyte is impregnated in the separator 33. The battery can 21 is formed of iron Fe coated with nickel Ni, where one end is closed and the other end is opened. In the battery can 21, a pair of insulating plates 22 and 23 is disposed perpendicular to the winding circumferential surfaces with the wound electrode member 30 interposed therebetween.

A battery lid 24 and a safety valve mechanism 25 and a heat-sensitive resistor (PTC: Positive Temperature Coefficient) element 26 disposed inside the battery lid 24 are attached to the open end of the battery can 21 by caulking with a gasket 27 and the inside of the battery can 21 is sealed air-tightly. The battery lid 24 is formed of the same material as the battery can 21. The safety valve mechanism 25 is electrically connected to the battery lid 24 through the heat-sensitive resistor element 26. When the internal voltage of the battery is higher than a predetermined value due to internal short-circuit or external heat, a disc plate 25A is inverted to tear down the electrical connection between the battery lid 24 and the wound electrode member 30.

The heat-sensitive resistor element 26 restricts the current due to the increase in resistance with the increase in temperature, thereby preventing the abnormal heating due to large current. The gasket 27 is formed of an insulating material and asphalt is applied to the surface thereof.

The wound electrode member 30 is wound on a center pin 34. A positive electrode lead 35 formed of aluminum Al is connected to the positive electrode 31 of the wound electrode member 30 and a negative electrode lead 36 formed of nickel Ni is connected to the negative electrode 32. The positive electrode lead 35 is electrically connected to the battery lid 24 by the welding to the safety valve mechanism 25 and the negative electrode lead 36 is electrically connected to the battery can 21 by the welding.

Figure 4:
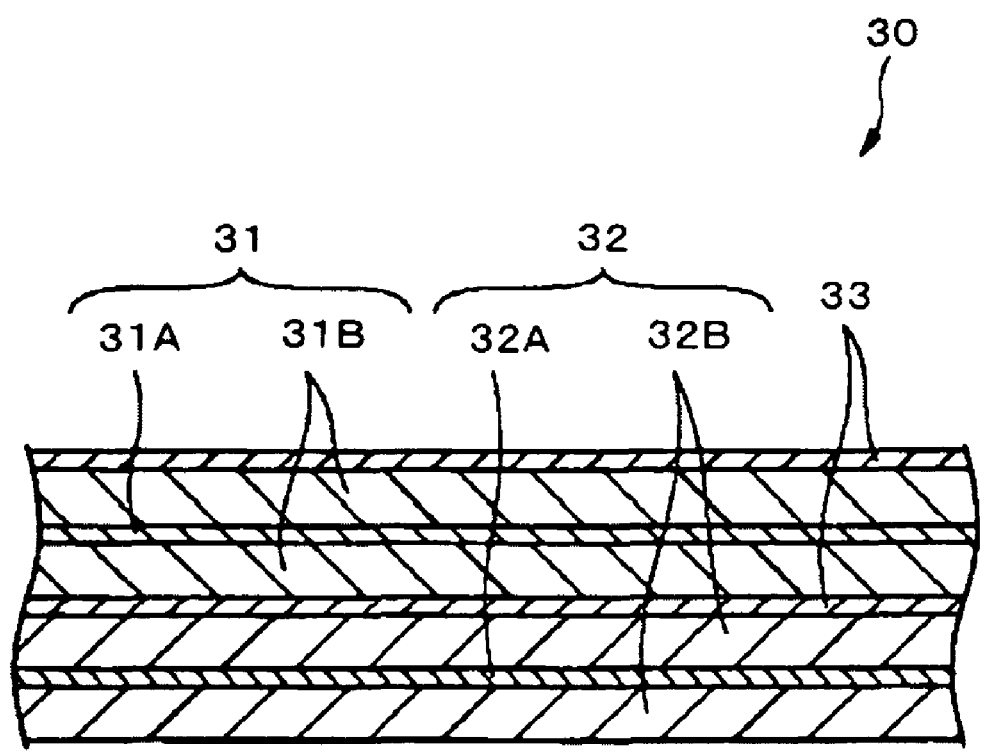
FIG. 4 is a partially-enlarged sectional view illustrating a wound electrode member 30 shown in FIG. 3.

FIG. 4 is a partially-enlarged sectional view illustrating the wound electrode member 30 shown in FIG. 3. The wound electrode member 30 is obtained by stacking and winding the positive electrode 31 and the negative electrode 32 with the separator 33 interposed therebetween.

The positive electrode 31 includes a positive-electrode current collector 31A and a positive-electrode mixture layer 31B disposed on both sides of the positive-electrode current collector 31A. The negative electrode 32 includes a negative-electrode current collector 32A and a negative-electrode mixture layer 32B disposed on both sides of the negative-electrode current collector 32A. The configurations of the positive-electrode current collector 31A, the positive-electrode mixture layer 31B, the negative-electrode current collector 32A, the negative-electrode mixture layer 32B, the separator 33, and the electrolyte are similar to those of the positive-electrode current collector 13A, the positive-electrode mixture layer 13B, the negative-electrode current collector 14A, the negative-electrode mixture layer 14B, the separator 15, and the electrolyte in the first embodiment.

3-3 Method of Manufacturing Secondary Battery

A method of manufacturing the secondary battery according to the third embodiment will be described now.

The positive electrode 31 is formed as follows. First, the positive-electrode active material, the conductive material, and the binder are mixed to prepare a positive-electrode mixture, the positive-electrode mixture is dispersed in a solvent such as 1-methyl-2-pyrrolidone to form a positive-electrode mixture slurry. Then, the positive-electrode mixture slurry is applied to the positive-electrode current collector 31A, the solvent is dried, and the resultant is compacted by a roll press machine to form the positive-electrode mixture layer 31B, thereby obtaining the positive electrode 31. The resultant obtained by adding phosphonic acid or methane sulfonic acid to a slurry including lithium composite oxide instead of the positive-electrode active material coated with sulfur and/or phosphorous may be used as the positive-electrode mixture slurry.

The negative electrode 32 is formed as follows. First, the negative-electrode active material and the binder are mixed to prepare a negative-electrode mixture and the negative-electrode mixture is dispersed in the solvent such as 1-methyl-2- pyrrolidone to form a negative-electrode mixture slurry. Then, the negative-electrode mixture slurry is applied to the negative-electrode current collector 32A, the solvent is dried, and the resultant is compacted by the roll press machine to form the negative-electrode mixture layer 32B, thereby obtaining the negative electrode 32.

The positive electrode lead 35 is attached to the positive-electrode current collector 31A by welding and the negative electrode lead 36 is attached to the negative-electrode current collector 32A by welding. Thereafter, the positive electrode 31 and the negative electrode 32 are wound with the separator 33 interposed between, the end of the positive electrode lead 35 is welded to the safety valve mechanism 25, the end of the negative electrode lead 36 are welded to the battery can 21, the wound positive electrode 31 and negative electrode 32 are housed in the battery can 21 with a pair of insulating plates 22 and 23 interposed between.

After the positive electrode 31 and the negative electrode 32 are housed in the battery can 21, the electrolyte is injected into the battery can 21 and is impregnated in the separator 33. Thereafter, the batter lid 24, the safety valve mechanism 25, and the heat-sensitive resistor element 26 are fixed to the open end of the battery can 21 by caulking with the gasket 27. In this way, the secondary battery shown in FIG. 3 is manufactured.

According to the third embodiment, it is possible to obtain the same advantages as the first embodiment.

4 Fourth Embodiment

A secondary battery according to a fourth embodiment has the same configuration as the first embodiment, except for the positive-electrode mixture layer. Elements equal to or corresponding to the those of the first embodiment are denoted by like reference numerals and signs.

The positive-electrode mixture layer 13B includes the positive-electrode active material containing at least one of sulfur S and phosphorous P in the vicinity of the particle surface of lithium composite oxide, and the content of at least one of sulfur S and phosphorous P in the vicinity of the particle surface of lithium composite oxide is the highest in the positive-electrode mixture layer 13B. At least one of sulfur S and phosphorous P is included, for example, as a compound in the positive-electrode mixture layer 13B. More specifically, sulfur S is contained, for example, as $Li_2SO_4$ in the positive-electrode mixture layer 13B and phosphorous P is contained, for example, as $Li_3PO_4$ or $LiCoPO_4$ in the positive-electrode mixture layer 13B. The lithium composite oxide is similar to that of the first embodiment and cerium Ce is included in the surface layer.

The content of at least one of sulfur S and phosphorous P is preferably equal to or more than 0.1 at. % and less than 10 at. % with respect to cobalt Co in the positive-electrode active material. When the content is equal to or more than 0.1 at. %, it is possible to obtain an excellent storage characteristic. When the content is less than 10 at. %, it is possible to suppress the increase in internal resistance or the decrease in capacity.

The mean particle size of the positive-electrode active material is preferably equal to or more than 1 μm and less than 30 μm. When the mean particle size is equal to or more than 1 μm, it is possible to suppress the reaction of the positive electrode and the electrolyte solution and thus to suppress the increase in gas generation. When the mean particle size is less than 30 μm, it is possible to obtain the sufficient capacity or the excellent load characteristic.

It is preferable that the specific surface area is equal to or more than 0.1 $m^2/g$ and less than 1 $m^2/g$. When the specific surface area is equal to or more than 0.1 $m^2/g$, it is possible to obtain the sufficient capacity and the excellent load characteristic. When the specific surface area is less than 1 $m^2/g$, it is possible to suppress the reaction of the positive electrode and the electrolyte solution and thus to suppress the increase in gas generation.

As a method of confirming that at least one of sulfur S and phosphorous P in the positive-electrode mixture layer 13B exists in the vicinity of the particle surface of lithium composite oxide, a method of embedding the positive electrode 13 in resin, performing the sectional intrusion, and then confirming the distribution in the section by the use of the TOF-SIMS can be used. By analyzing elements by the use of the XPS while sputtering the surface of the positive electrode with argon, the confirmation can be made.

The positive-electrode mixture layer 13B has the peaks of one or more secondary ion fragments selected from positive secondary ions of $Li_4PO_4$, $Li_2CoPO_4$, $Li_2CoPH_2O_4$, $Li_3CoPO_4$, and $Li_3CoPO_4H$ and negative secondary ions of $PO_2$, $LiP_2O_4$, $Co_2PO_4$, $CoP_2O_5$, $CoP_2O_5H$, $CoP_2O_6$, and $CoP_2O_6H$ in the surface analysis using the TOF-SIMS.

The positive-electrode mixture layer 13B can be formed as follows.

The positive-electrode active material, the conductive material, the binder, and at least one of a sulfur-containing compound and a phosphorous-containing compound are mixed to prepare a positive-electrode mixture, the positive-electrode mixture is kneading in N-methyl pyrrolidone as the dispersion medium to form paste-like positive-electrode mixture slurry, the positive-electrode mixture slurry is applied to the positive-electrode current collector 13A, dried, and compacted. In this way, the positive-electrode mixture layer 13B is formed. The sulfur-containing compound and the phosphorous-containing compound can be the same as described in the first embodiment.

According to the fourth embodiment, it is possible to obtain the same advantages as the first embodiment.

EXAMPLES

The present application will be described now in more detail with reference to examples and comparative examples, but the present application is not limited to the examples.

Example A

A positive-electrode active material was manufactured as follows. First, predetermined amounts of ultrafine powders of $LiCoO_2$ and $CeO_2$ were weighed so as to have a mol ratio of Co:Ce=95:5, placed in a powder complicating machine Nobilta NOB made by Hosokawa Micron Corporation, and then processed with the power of 4 kW for 15 minutes. A desired positive-electrode active material was obtained by heating the processed powders in an air stream at 950° C. for 5 hours and then filtering the powders with a 75 μm or less sieve.

Then, as the result of surface analysis of an element distribution of the manufactured positive-electrode active material with the SEM-EDS, it was seen that the element ratio of cerium Ce is 31 at. %, the cerium Ce element is detected at the higher mol ratio relative to the feed amount, and the cerium Ce element exists much in the surface of the positive-electrode active material, that is, the concentration of Ce is higher in the surface than in the inside.

Then, 96 wt % of the manufactured positive-electrode active material, 3 wt % of polyvinylidene fluoride as the first polymer of the binder, and 1 wt % of Ketjen black as the conductive material were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

Graphite as the negative-electrode active material and polyvinylidene fluoride (PVDF) as the binder were mixed at the mass ratio of 90:10 and the resultant negative-electrode mixture was dispersed in 1-methyl-2-pyrrolidone, thereby forming a negative-electrode mixture slurry. Then, the negative-electrode mixture slurry was applied to the negative-electrode current collector, dried to remove the solvent, and compacted by the use of the roll press machine to form the negative-electrode mixture layer, thereby manufacturing the negative electrode.

The negative electrode and the positive electrode manufactured as described above were stacked with the separator formed of a polypropylene film and wound in the longitudinal direction, and the protective tape was bonded to the outermost portion thereof, thereby manufacturing a battery element.

Finally, the manufactured battery element was inserted into a sheath member formed of an aluminum laminate film with an aluminum foil interposed between polyolefin, the outer edges other than one edge were thermally fused to form a bag shape, and the battery element was housed in the sheath member. Then, the electrolyte was injected into the sheath member through the non-fused portion and then the non-fused portion of the sheath member was sealed air-tightly. A solution obtained by solving 1.0 mol/dm$^3$ of LiPF$_6$ of the lithium salt in a solvent in which fluoroethylene carbonate (FEC) and diethyl carbonate (DEC) are mixed at the mass ratio of 3:7 was used as the electrolyte solution. In this way, a flat type secondary battery of a 500 mAh class was manufactured.

Example B

A positive-electrode active material was manufactured as follows. First, predetermined amounts of ultrafine powders of LiCoO$_2$ and CeO$_2$ were weighed so as to have a mol ratio of Co:Ce=95:5, placed in a powder complicating machine Nobilta NOB made by Hosokawa Micron Corporation, and then processed with the power of 4 kW for 15 minutes. A desired positive-electrode active material was obtained by heating the processed powders in an air stream at 950° C. for 5 hours and then filtering the powders with a 75 μm or less sieve.

Then, as the result of surface analysis of an element distribution of the manufactured positive-electrode active material with the SEM-EDS, it was seen that the element ratio of cerium Ce is 31 at. %, the cerium element is detected at the higher mol ratio relative to the feed amount, and the cerium Ce element exists much in the surface of the positive-electrode active material.

95.975 wt % of the active material, 3 wt % of polyvinylidene fluoride as the binder, 1 wt % of Ketjen black as the conductive material, and 0.025 wt % of H$_3$PO$_3$ were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

A battery was manufactured in the same way as Example A, except that the positive electrode is used.

Example 1

A positive-electrode active material was manufactured as follows. First, predetermined amounts of ultrafine powders of LiCoO$_2$ and CeO$_2$ were weighed so as to have a mol ratio of Co:Ce=98.5:1.5, placed in a powder complicating machine Nobilta NOB made by Hosokawa Micron Corporation, and then processed with the power of 4 kW for 15 minutes. A desired positive-electrode active material was obtained by heating the processed powders in an air stream at 950° C. for 5 hours and then filtering the powders with a 75 μm or less sieve.

Then, as the result of surface analysis of an element distribution of the manufactured positive-electrode active material with the SEM-EDS, it was seen that the element ratio of cerium Ce is 9 at. %, the cerium Ce element is detected at the higher mol ratio relative to the feed amount, and the cerium Ce element exists much in the surface of the positive-electrode active material, that is, the concentration of Cerium Ce is higher in the surface than in the inside.

Then, 96 wt % of the manufactured positive-electrode active material, 3 wt % of polyvinylidene fluoride as the first polymer of the binder, and 1 wt % of Ketjen black as the conductive material were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

A negative electrode was manufactured as follows using silicon as the negative-electrode active material and using a deposition method. Metal silicon ground into a chip shape was pulverized up to 1 μm by the use of a jet mill. The silicon powder was dispersed in 3 wt % of polyamide acid (polyimide precursor)/NMP solution to form a slurry shape, the slurry was applied to an electrolyte copper foil as the negative-electrode current collector, dried, and then compacted by the use of the roll press machine. Thereafter, the resultant was subjected to heat treatment in vacuum at 400° C. for 3 hours. As a result, the negative electrode was manufactured. In this state, the initial composition of the slurry was adjusted by measurement of mass so that the weight ratio of silicon and polyimide is 90:10 from the weight measurement.

The negative electrode and the positive electrode manufactured as described above were stacked with the separator formed of a polypropylene film and wound in the longitudinal direction, and the protective tape was bonded to the outermost circumferential portion thereof, thereby manufacturing a battery element.

Finally, the manufactured battery element was inserted into a sheath member formed of an aluminum laminate film with an aluminum foil interposed between polyolefin, the outer edges other than one edge were thermally fused to form a bag shape, and the battery element was housed in the sheath member. Then, the electrolyte was injected into the sheath member through the non-fused portion and then the non-fused portion of the sheath member was sealed air-tightly. A solution obtained by solving 1.0 mol/dm$^3$ of LiPF$_6$ of the lithium salt in a solvent in which fluoroethylene carbonate (FEC) and diethyl carbonate (DEC) are mixed at the mass ratio of 3:7 was used as the electrolyte solution. In this way, a flat type secondary battery of a 500 mAh class was manufactured.

Example 2

A battery was manufactured by synthesizing the positive-electrode active material in the same way as Example 1, except that predetermined amounts of ultrafine powders of $LiCoO_2$ and $CeO_2$ were weighed so as to have a mol ratio of Co:Ce=97:3 and processed by the powder complicating machine Nobilta NOB made by Hosokawa Micron Corporation.

Example 3

A battery was manufactured by synthesizing the positive-electrode active material in the same way as Example 1, except that predetermined amounts of ultrafine powders of $LiCoO_2$ and $CeO_2$ were weighed so as to have a mol ratio of Co:Ce=95:5 and processed by the powder complicating machine Nobilta NOB made by Hosokawa Micron Corporation.

Example 4

A positive-electrode active material was manufactured as follows. First, predetermined amounts of ultrafine powders of $LiCoO_2$ and $CeO_2$ were weighed so as to have a mol ratio of Co:Ce=98.5:1.5, placed in a powder complicating machine Nobilta NOB made by Hosokawa Micron Corporation, and then processed with the power of 4 kW for 15 minutes. A desired positive-electrode active material was obtained by heating the processed powders in an air stream at 950° C. for 5 hours and then filtering the powders with a 75 μm or less sieve.

Then, as the result of surface analysis of an element distribution of the manufactured positive-electrode active material with the SEM-EDS, it was seen that the element ratio of cerium Ce is 9.7 at. %, the cerium Ce element is detected at the higher mol ratio relative to the feed amount, and the cerium Ce element exists much in the surface of the positive-electrode active material.

95.95 wt % of the active material, 3 wt % of polyvinylidene fluoride as the binder, 1 wt % of Ketjen black as the conductive material, and 0.05 wt % of $H_3PO_3$ were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

Then, the positive electrode was analyzed by the use of the TOF-SIMS. The peaks of fragments based on positive secondary ions of $Li_4PO_4$, $Li_2CoPO_4$, $Li_2CoPH_2O_4$, $Li_3CoPO_4$, and $Li_3CoPO_4H$ and negative secondary ions of $PO_2$, $LiP_2O_4$, $Co_2PO_4$, $CoP_2O_5$, $CoP_2O_5H$, $CoP_2O_6$, and $CoP_2O_6H$ were observed. This result indicates that compounds such as $Li_3PO_4$ and $LiCoPO_4$ exist in the particle surface of the positive-electrode active material.

The positive electrode was analyzed by the use of the TOF-SIMS as follows. The positive electrode was embedded in resin, the section was processed by the use of an argon ion milling machine, and then the TOF-SIMS analysis was performed thereon. TOF-SIMSV made by ION-TOF was used for the TOF-SIMS analysis under the measurement conditions of primary ions of 197 $Au^+$, ion-gun accelerating voltage of 25 keV, unbunching, radiated ion current of 0.5 pA (measured with a pulse beam), pulse frequency of 50 kHz, mass range of 1 to 200 amu, scanning range of 25×25 μtm, and spatial resolution of 0.2 μm. It could be seen from the analysis result that phosphorous compounds such as $PO_3$ exist to cover $LiCoO_2$ particles. Then, a battery was manufactured similarly to Example 1, except that the positive electrode manufactured as described above is used.

Example 5

A positive-electrode active material was manufactured as follows. First, predetermined amounts of ultrafine powders of $LiCoO_2$ and $CeO_2$ were weighed so as to have a mol ratio of Co:Ce=98.5:1.5, placed in a powder complicating machine Nobilta NOB made by Hosokawa Micron Corporation, and then processed with the power of 4 kW for 15 minutes. A desired positive-electrode active material was obtained by heating the processed powders in an air stream at 950° C. for 5 hours and then filtering the powders with a 75 μm or less sieve.

95.975 wt % of the active material, 3 wt % of polyvinylidene fluoride as the binder, 1 wt % of Ketjen black as the conductive material, and 0.025 wt % of $H_3PO_3$ were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

A battery was manufactured similarly to Example 1, except that the manufactured positive electrode is used.

Example 6

A positive-electrode active material was manufactured as follows. First, predetermined amounts of ultrafine powders of $LiCoO_2$ and $CeO_2$ were weighed so as to have a mol ratio of Co:Ce=98.5:1.5, placed in a powder complicating machine Nobilta NOB made by Hosokawa Micron Corporation, and then processed with the power of 4 kW for 15 minutes. A desired positive-electrode active material was obtained by heating the processed powders in an air stream at 950° C. for 5 hours and then filtering the powders with a 75 μm or less sieve.

95.99 wt % of the active material, 3 wt % of polyvinylidene fluoride as the binder, 1 wt % of Ketjen black as the conductive material, and 0.01 wt % of $H_3PO_3$ were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

A negative electrode was manufactured as follows using silicon as the negative-electrode active material and using a deposition method. A partially-oxidized amorphous silicon layer was formed with a thickness of 4 μm on an electrolyte copper foil of which the surface was roughened, using the same metal silicon (purity of 99%) as used in Example 1 and using an electron beam deposition method, while introducing oxygen gas diluted with argon into a chamber.

A battery was manufactured similarly to Example 1, except that the manufactured positive electrode and negative electrode are used.

Example 7

A positive-electrode active material was manufactured as follows. First, predetermined amounts of ultrafine powders of LiCoO$_2$ and CeO$_2$ were weighed so as to have a mol ratio of Co:Ce=98.5:1.5, placed in a powder complicating machine Nobilta NOB made by Hosokawa Micron Corporation, and then processed with the power of 4 kW for 15 minutes. A desired positive-electrode active material was obtained by heating the processed powders in an air stream at 950° C. for 5 hours and then filtering the powders with a 75 μm or less sieve.

95.99 wt % of the active material, 3 wt % of polyvinylidene fluoride as the binder, 1 wt % of Ketjen black as the conductive material, and 0.01 wt % of sulfobenzoic acid were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

A battery was manufactured similarly to Example 5, except that the manufactured positive electrode is used.

Example 8

A positive electrode was manufactured as follows. 95.9 wt % of LiCoO$_2$ with a mean particle size of 12 μm and a specific surface area of 0.20 m$^2$/g, 3 wt % of polyvinylidene fluoride as the first polymer of the binder, 0.05 wt % of polyvinyl pyrrolidone as the second polymer, 1 wt % of Ketjen black as the conductive material, and 0.05 wt % of methane sulfonic acid were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

As the result of analysis using the TOF-SIMS, the same peaks of secondary ions fragments as Example 4 were observed.

Then, a secondary battery was manufactured similarly to Example 7, except that the positive electrode manufactured as described above is used.

Example 9

A positive electrode was manufactured as follows. 95.9 wt % of LiCoO$_2$ with a mean particle size of 12 μm and a specific surface area of 0.20 m$^2$/g, 3 wt % of polyvinylidene fluoride as the first polymer of the binder, 0.05 wt % of polyvinyl pyrrolidone as the second polymer, 1 wt % of Ketjen black as the conductive material, and 0.05 wt % of sulfobenzoic anhydride were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

As the result of analysis using the TOF-SIMS, the same peaks of secondary ions fragments as Example 4 were observed.

Then, a secondary battery was manufactured similarly to Example 7, except that the positive electrode manufactured as described above is used.

Comparative Example A

A positive electrode was manufactured as follows. 96 wt % of LiCoO$_2$ with a mean particle size of 12 μm and a specific surface area of 0.20 m$^2$/g, 3 wt % of polyvinylidene fluoride as the binder, and 1 wt % of Ketjen black as the conductive material were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

Then, the positive electrode was analyzed using the TOF-SIMS. As a result, the peaks of fragments based on positive secondary ions of Li$_4$PO$_4$, Li$_2$CoPO$_4$, Li$_2$CoPH$_2$O$_4$, Li$_3$CoPO$_4$, and Li$_3$CoPO$_4$H and negative secondary ions of PO$_2$, LiP$_2$O$_4$, Co$_2$PO$_4$, CoP$_2$O$_5$, CoP$_2$O$_5$H, CoP$_2$O$_6$, and CoP$_2$O$_6$H were not observed. Similarly to Example 4, as the result of analysis using the TOF-SIMS after embedding the positive electrode in resin and processing the section with the argon ion milling machine, it could be seen that phosphorous compounds do not exist in the sectional surface. Then, a secondary battery was manufactured similarly to Example A, except that the positive electrode manufactured as described above is used.

Comparative Example B

A positive electrode was manufactured as follows. 95.8 wt % of LiCoO$_2$ with a mean particle size of 12 μm and a specific surface area of 0.20 m$^2$/g, 3 wt % of polyvinylidene fluoride as the binder, 1 wt % of Ketjen black as the conductive material, and 0.05 wt % of H$_3$PO$_3$ were kneaded in N-methyl pyrrolidone as the dispersion medium to form a positive-electrode mixture slurry. The slurry was applied to a positive-electrode current collector formed of aluminum with a thickness of electrode 30 μm, dried, and compacted by the use of the roll press machine to form a positive-electrode mixture layer, thereby manufacturing the positive electrode.

Then, a secondary battery was manufactured similarly to Example A, except that the positive electrode manufactured as described above is used.

Comparative Example 1

A positive electrode was manufactured as follows. 96 wt % of LiCoO$_2$ with a mean particle size of 12 μm and a specific surface area of 0.20 m$^2$/g, 3 wt % of polyvinylidene fluoride as the binder, and 1 wt % of Ketjen black as the conductive material were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

Then, the positive electrode was analyzed using the TOF-SIMS. As a result, the peaks of fragments based on positive secondary ions of Li$_4$PO$_4$, Li$_2$CoPO$_4$, Li$_2$CoPH$_2$O$_4$, Li$_3$CoPO$_4$, and Li$_3$CoPO$_4$H and negative secondary ions of PO$_2$, LiP$_2$O$_4$, Co$_2$PO$_4$, CoP$_2$O$_5$, CoP$_2$O$_5$H, CoP$_2$O$_6$, and CoP$_2$O$_6$H were not observed. Similarly to Example 4, as the result of analysis using the TOF-SIMS after embedding the positive electrode in resin and processing the section with the argon ion milling machine, it could be seen that phosphorous compounds do not exist in the sectional surface. Then, a secondary battery was manufactured similarly to Example 1, except that the positive electrode manufactured as described above is used.

Comparative Example 2

A positive electrode was manufactured as follows. 95.8 wt % of $LiCoO_2$ with a mean particle size of 12 μm and a specific surface area of 0.20 m$^2$/g, 3 wt % of polyvinylidene fluoride as the binder, 1 wt % of Ketjen black as the conductive material, and 0.2 wt % of $H_3PO_4$ were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

Then, a secondary battery was manufactured similarly to Example 1, except that the positive electrode manufactured as described above is used.

Comparative Example 3

A positive electrode was manufactured as follows. 95.8 wt % of $LiCoO_2$ with a mean particle size of 12 μm and a specific surface area of 0.20 m$^2$/g, 3 wt % of polyvinylidene fluoride as the binder, 1 wt % of Ketjen black as the conductive material, and 0.05 wt % of $H_3PO_4$ were kneaded in N-methyl pyrrolidone as the dispersion medium to form a positive-electrode mixture slurry. The slurry was applied to a positive-electrode current collector formed of aluminum with a thickness of 30 μm, dried, and compacted by the use of the roll press machine to form a positive-electrode mixture layer, thereby manufacturing the positive electrode.

Then, a secondary battery was manufactured similarly to Example 1, except that the positive electrode manufactured as described above is used. Estimation of High-Temperature Storage Characteristic The secondary battery manufactured as described above was charged with constant current of 0.2 C until the battery voltage reaches 4.2 V and then charged with constant voltage of 4.2 V until the current value reaches 0.01 C. Then, constant current discharge was made with a constant current density of 0.2 C until the battery voltage reaches 2.5 V. The secondary battery charged up to 4.2 V after the first charging and discharging was stored in a constant-temperature bath of 85° C. for 12 hours. Thereafter, the increase in thickness was calculated from the pack thicknesses measured before the storage and after the storage, and the increase in thickness was used as a criterion of the amount of generated gas due to the positive electrode.

The variation rates in thickness of the examples and the comparative examples were calculated by the use of the following expression using the calculated increase in thickness. The results are shown in Table 1. In the variation rates in thickness, the variation rate in pack thickness of Comparative Example 1 was assumed as being 100%.

Variation rate in thickness of aluminum laminate pack (%)=[(increase in pack thickness after storage at 85° C. for 12 hours in respective Examples (mm))/(increase in pack thickness after storage at 85° C. for 12 hours in Comparative Example A (mm))]×100

Comparison of Nature of Positive-Electrode Mixture Slurry

Between the examples and the comparative examples, the additional amounts of dispersion medium (N-methyl pyrrolidone) required for completion of the optimal-viscosity slurry at the time of manufacturing the positive-electrode mixture slurry were compared using the values calculated by the use of the following expression.

Ratio of dispersion medium (%)=[(amount of N-methyl pyrrolidone necessary for manufacturing mixture slurry in respective Examples (g))/(amount of N-methyl pyrrolidone necessary for Comparative Example 1 (g))]×100

The peeling resistance between the positive-electrode mixture layer and the current collector was measured and compared. The coated and pressed electrode was cut with a width of 25 mm, a double-sided tape was attached thereto, and the foil was peeled, whereby the peeling resistance was measured. The peeling resistance was compared using the values calculated by the following expression.

Ratio of peeling resistance (%)=[(peeling resistance of positive electrode manufactured in respective Examples (N/mm))/(peeling resistance of positive electrode manufactured in Comparative Example A (N/mm))]×100

TABLE 1

| | Positive-electrode active material | Addition to mixture slurry | Mol ratio of P, S/Co (at. %) | Ratio of dispersion medium (%) | Ratio of peeling resistance (%) | Negative electrode manufacturing method | Variation rate in thickness of battery (%) |
|---|---|---|---|---|---|---|---|
| Example A | LiCo: 0.95, Ce: 0.0502 | — | — | 99 | 100 | Graphite | 85 |
| Example B | LiCo: 0.95, Ce: 0.0502 | $H_3PO_4$ | 0.03 | 106 | 98 | Graphite | 69 |
| Example 1 | LiCo: 0.985, Ce: 0.01502 | — | — | 99 | 100 | Application | 85 |
| Example 2 | LiCo: 0.97, Ce: 0.0302 | — | — | 101 | 99 | Application | 74 |
| Example 3 | LiCo: 0.95, Ce: 0.0502 | — | — | 102 | 100 | Application | 61 |
| Example 4 | LiCo: 0.95, Ce: 0.0502 | $H_3PO_4$ | 0.06 | 118 | 95 | Application | 20 |
| Example 5 | LiCo: 0.95, Ce: 0.0502 | $H_3PO_4$ | 0.03 | 106 | 98 | Application | 40 |
| Example 6 | LiCo: 0.95, Ce: 0.0502 | $H_3PO_4$ | 0.01 | 102 | 100 | deposition | 52 |
| Example 7 | LiCo: 0.95, Ce: 0.0502 | sulfo-benzoic anhydride | 0.02 | 105 | 106 | deposition | 65 |
| Comparative Example A | $LiCoO_2$ | No addition | — | 100 | 100 | Graphite | 100 |
| Comparative Example B | $LiCoO_2$ | No addition | 0.06 | 117 | 82 | Graphite | 66 |
| Comparative Example 1 | $LiCoO_2$ | No addition | — | 100 | 100 | Application | 100 |
| Comparative Example 2 | $LiCoO_2$ | $H_3PO_4$ | 0.3 | 125 | 15 | Application | 25 |
| Comparative Example 3 | $LiCoO_2$ | $H_3PO_4$ | 0.06 | 118 | 81 | Application | 49 |

It can be seen from Table 1 that it is possible to suppress the increase in thickness of the laminate pack due to the high-temperature storage in Examples 1 to 7 in comparison with Comparative Example 1. It can be seen that the increase in thickness can be suppressed in a sample in which cerium Ce is attached to the surface of the active material, but the generation of gas due to the reaction of the charged positive electrode and the electrolyte solution can be further suppressed in the battery in which the compounds containing phosphorous P or sulfur S are added to the positive-electrode slurry.

However, by adding only the compounds containing phosphorous P or sulfur S to the positive electrode as described in Comparative Examples 2 and 3, a large amount of dispersion medium is required for manufacturing the positive-electrode mixture slurry and the peeling resistance after pressing is markedly deteriorated. On the contrary, in Examples 4 to 9, the active material having been subjected to the surface treatment with cerium is used. Accordingly, even when the addition of the compounds containing phosphorous P or sulfur S is suppressed to the minimum, it is possible to obtain the satisfactory high-temperature storage characteristic. As a result, it is possible to reduce the amount of dispersion medium and to improve the peeling resistance after pressing.

Accordingly, according to the embodiment, it is possible to provide a battery employing a high-capacity negative electrode, with a high-temperature storage characteristic and excellent in productivity and durability of the positive electrode.

Although the present application has been described in detail with reference to the embodiments and the examples, the present application is not limited to the embodiments and the examples, but may be modified in a variety of suitable ways.

For example, the numerical values described in the embodiments and the examples are only examples and numerical values different therefrom may be used as needed.

Although it has been described in the embodiments and the examples that the present application is applied to the flat and cylindrical secondary batteries, the present application may be similarly applied to secondary batteries of an angular type, a button type, a thin type, a large-scaled type, and a laminate type. The present application may be applied to primary batteries, as well as the secondary batteries.

Although it has been described in the embodiments and the examples that the present application is applied to the secondary batteries employing a single body of graphite or silicon Si as the negative-electrode active material, the positive electrode according to the present application may be similarly applied to secondary batteries employing as the negative-electrode active material an alloy of silicon Si, a mixed body of silicon Si and carbon C, or a single body or a compound including an element such as tin Sn or germanium Ge.

In the embodiments, lithium composite oxide having the layered structure expressed by the following formula (2) or lithium composite phosphate having the phosphate structure expressed by the following formula (3) may be used as the lithium composite oxide in the embodiments.

$$Li_pNi_{(1-q-r)}Mn_qM1_rO_{(2-y)}X_z \quad (2)$$

Here, M1 represents at least one element selected of Group 2 to Group 15 other than Ni and Mn. X represents at least one element selected from Group 16 and Group 17 other than oxygen O. In addition, p, q, y, and z represent values satisfying $0 \leq p \leq 1.5$, $0 \leq q \leq 1.0$, $0 \leq r \leq 1.0$, $-0.10 \leq y \leq 0.20$, and $0 \leq z \leq 0.2$, respectively.

$$Li_aM2_bPO_4 \quad (3)$$

Here, M2 represents at least one element selected from Groups 2 to 15, and a and b represent values satisfying $0 \leq a \leq 2.0$ and $0.5 \leq b \leq 2.0$, respectively.

It should be understood by those skilled in the art that various modifications, combinations, sub-combinations, and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A positive-electrode active material for a lithium-ion secondary battery comprising an average composition expressed by the following formula (1):

$$Li_xCo_{1-y-z}M_yCe_zO_{b-a}X_a \quad (1)$$

wherein M represents at least one element selected from the group consisting of boron B, magnesium Mg, aluminum Al, silicon Si, phosphorus P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb, X represents a halogen element, and x, y, z, a, and b satisfy $0.2 < x \leq 1.2$, $0 \leq y \leq 0.1$, $0.015 \leq z 0.05$, $1.8 \leq b \leq 2.2$, and $0 \leq a \leq 1.0$, respectively, wherein the concentration of cerium Ce is higher in a vicinity of a surface of the positive-electrode active material as composed to an inside thereof.

2. The positive-electrode active material according to claim 1, wherein the positive-electrode active material is particle shaped and at least in a part of the surface has a surface layer where the concentration of cerium Ce is higher than the inside of the particle.

3. The positive-electrode active material according to claim 1, wherein the content of cerium Ce in the vicinity of the surface ranges from 5 at. % to 50 at. % with respect to cobalt Co.

4. A positive electrode for a lithium-ion secondary battery comprising a positive-electrode mixture layer and a current collector, the positive-electrode mixture layer including a positive-electrode active material, a conductive material, and a binder, wherein the positive-electrode active material has an average composition expressed by the following formula (1):

$$Li_xCo_{1-y-z}M_yCe_zO_{b-a}X_a \quad (1)$$

wherein M represents at least one element selected from the group consisting of boron B, magnesium Mg, aluminum Al, silicon Si, phosphorus P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb, X represents a halogen element, and x, y, z, a, and b satisfy $0.2 < x \leq 1.2$, $0 \leq y \leq 0.1$, $0.015 \leq z \leq 0.05$, $1.8 \leq b \leq 2.2$, and $0 \leq a \leq 1.0$, respectively, wherein the concentration of cerium Ce is higher in a vicinity of a surface of the positive-electrode active material as compared to an inside thereof, and wherein a compound including sulfur S and/or phosphorous P is included in the positive-electrode mixture layer.

5. The positive electrode according to claim 4, wherein the content of sulfur S and/or phosphorous P in the positive-electrode mixture layer is equal to or greater than 0.02 at. % and less than 0.10 at. % with respect to cobalt Co.

6. The positive electrode according to claim 4, wherein the compound including sulfur S and/or phosphorous P in the positive-electrode mixture layer is higher in concentration in the vicinity of the surface of the positive-electrode active material than in the inside thereof.

7. The positive electrode according to claim 4, wherein the positive electrode is used along with a negative electrode which intercalate and deintercalate lithium ions and which includes at least one element selected from the group consisting of silicon Si, tin Sn, and germanium Ge as a metal material that can occlude and desorb lithium ions.

8. A method of manufacturing a positive electrode for a lithium-ion secondary battery including a positive-electrode mixture layer, which includes a positive-electrode active material, a conductive material, and a binder, and a current collector, the method comprising:

providing the positive-electrode active material has an average composition expressed by the following formula (1):

$$Li_xCo_{1-y-z}M_yCe_zO_{b-a}X_a \quad (1)$$

wherein M represents at least one element selected from the group consisting of boron B, magnesium Mg, aluminum Al, silicon Si, phosphorus P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb, X represents a halogen element, and x, y, z, a, and b satisfy $0.2 < x \leq 1.2$, $0 \leq y \leq 0.1$, $0.015 \leq z \leq 0.05$, $1.8 \leq b \leq 2.2$, and $0 \leq a \leq 1.0$, respectively, and wherein the concentration of cerium Ce is higher in a vicinity of a surface of the positive-electrode active material as compared to an inside thereof; and adding a compound containing sulfur S and/or phosphorous P to a positive-electrode mixture slurry used to form the positive-electrode mixture layer.

9. A lithium-ion secondary battery comprising:

a positive electrode, which includes a positive-electrode mixture layer having a positive-electrode active material, a conductive material, and a binder, and a current collector;

a negative electrode; and an electrolyte, wherein the positive-electrode active material has an average composition expressed by the following formula (1):

$$Li_xCo_{1-y-z}M_yCe_zO_{b-a}X_a \quad (1)$$

wherein M represents at least one element selected from the group consisting of boron B, magnesium Mg, aluminum Al, silicon Si, phosphorus P, sulfur S, titanium Ti, chromium Cr, manganese Mn, iron Fe, cobalt Co, nickel Ni, copper Cu, zinc Zn, gallium Ga, yttrium Y, zirconium Zr, molybdenum Mo, silver Ag, tungsten W, indium In, tin Sn, lead Pb, and antimony Sb, X represents a halogen element, and x, y, z, a, and b satisfy $0.2 < x \leq 1.2$, $0 \leq y \leq 0.1$, $0.015 \leq z \leq 0.05$, $1.8 \leq b \leq 2.2$, and $0 \leq a \leq 1.0$, respectively, wherein the concentration of cerium Ce is higher in a vicinity of a surface of the positive-electrode material as compared to an inside thereof, and wherein a compound including sulfur S and/or phosphorous P is included in the positive-electrode mixture layer.

10. The lithium-ion secondary battery according to claim 9, wherein the electrolyte includes a cyclic ester carbonate or a chained ester carbonate in which all or a part of hydrogen is fluorinated.

* * * * *